Figure 1:
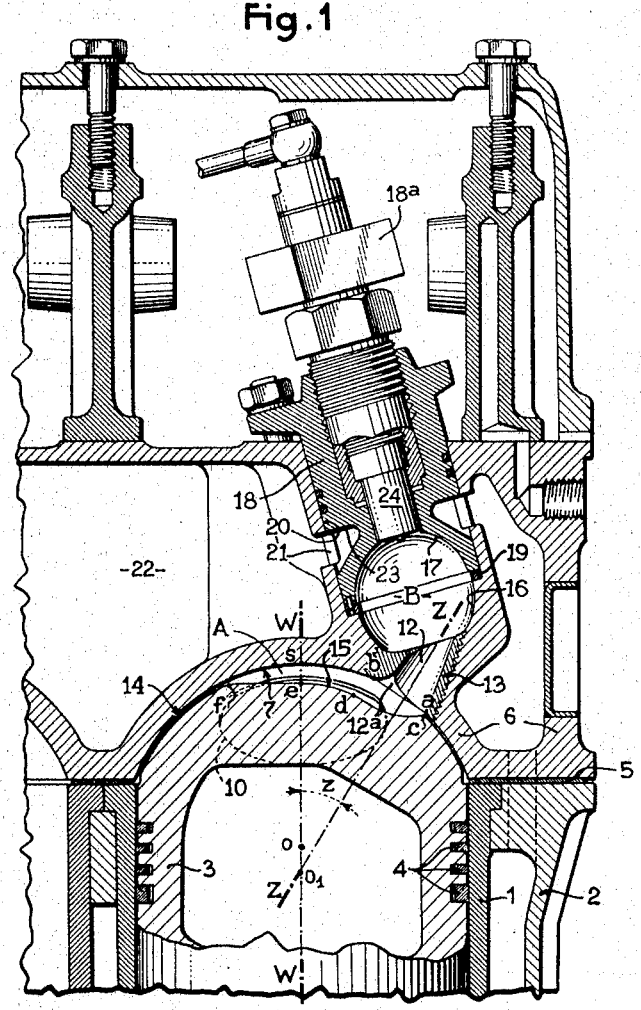

Aug. 2, 1966     M. FRANÇOIS     3,263,659

INTERNAL COMBUSTION ENGINE

Filed Dec. 17, 1963

United States Patent Office 3,263,659
Patented August 2, 1966

3,263,659
INTERNAL COMBUSTION ENGINE
Marcel François, Chatenay-Malabry, France, assignor to Hotchkiss-Brandt, Paris, France, a corporation of France
Filed Dec. 17, 1963, Ser. No. 331,172
Claims priority, application France, Dec. 18, 1962, 919,031, Patent 1,350,803
4 Claims. (Cl. 123—32)

The present invention relates to internal combustion engines of the diesel and like type having a precombustion chamber for small and medium engine capacities.

As is known, in these engines the cylinder head is either flat or has insufficient sphericity to permit placing a transfer passageway for conducting the injected fuel to the vicinity of the axis of a combustion chamber and, furthermore, disposing fuel air induction and exhaust valves having sufficient diameter for suitably feeding said chamber and obtaining an effective scavenging of the engine at high operating speeds.

Further, in known engines having a precombustion chamber the transfer passageway usually leads to a portion of the piston head of small area located rather near to the periphery of the piston head which results in an extremely important thermic concentration in a narrow zone of the piston in the immediate vicinity of the piston rings. The heat is evacuated in an uneven manner by the rubbing part of the skirt of the piston so that there is a local expansion of this skirt with a consequential danger of imperfect lubrication, abnormal wear and possible seizing. Further, the gasket of the cylinder head is also very weak in this region and may be rapidly damaged.

The object of the invention is to remedy these disadvantages and permit increasing the operating speed and efficiency of the engine while reducing its weight. The invention provides an internal combustion engine which is of the type having an injection prechamber connected by a transfer port to the combustion chamber and in which the combustion chamber is roughly hemispherical and the transfer port communicates with this chamber in a direction which is at least nearly that of the axis of said chamber.

In a preferred embodiment, the axis of the transfer port has a more or less radial direction relative to the combustion chamber.

According to another feature of the invention, the induction and exhaust valves are disposed in the hemispherical wall of the combustion chamber in such manner that their axes form therebetween a large angle in the neighbourhood of 70° which permits giving these valves optimum dimensions. These valves lie in a plane perpendicular to the longitudinal axis of the engine.

The combination of the aforementioned features permits increasing the speed and efficiency of the engine and reducing its weight. This last advantage results in a very marked reduction in cost price.

Further features and advantages of the invention will be apparent from the ensuing description with reference to the accompanying drawings to which the invention is in no way limited.

Figure 2:
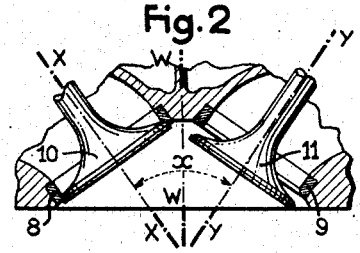

In the drawings:

FIG. 1 is a partial longitudinal sectional view of an engine embodying the invention, and FIG. 2 is a partial sectional view taken along line 2—2 of FIG. 1 on a reduced scale.

In the illustrated embodiment, the reference numeral 1 represents the cylinder liner which is inserted in the cylinder block 2 and in which is movable the piston 3 provided with its piston rings 4. Secured to this liner 1 and the cylinder block 2, with interposition of a gasket 5, is the cylinder head 6. In alignment with the axis of each cylinder 1 the cylinder head 6 comprises an almost hemispherical dome-shaped cavity 7 having its centre located at O slightly below the gasket 5. The longitudinal axis W—W of the assembly intersects the centre O and the top S of the dome.

This cylinder head carries (FIG. 2) the seats 8 and 9 for valves 10 and 11 of air induction and exhaust ports. Their axes X—X and Y—Y intersect on the axis W—W at the centre O and form therebetween an angle $x$ in the neighbourhood of 70° which permits giving these valves optimum dimensions.

The combustion chamber A formed between the dome 7 of the cylinder head 6 and the piston 2, communicates with a precombustion chamber B by way of a transfer port 12 formed in an attached element 13. This chamber B is placed in the cylinder head 6 in such manner that the port 12 communicates with the combustion chamber A at $a$–$b$ in a region relatively remote from the periphery of dome-shaped cavity 7 and consequently rather near to the top S of this cavity, the axis Z—Z of the port having a direction which is roughly radial since it intersects the longitudinal axis W—W at a point $O_1$ which, if not coincident with the centre O, is at least very near to the latter.

The transfer port 12 diverges from the chamber B toward the chamber A in a roughly frustoconical diffusion shape, the truncated cone progressively diverging toward the top S of the cavity and being connected to the spherical face of the combustion chamber A by a rounded or radiused mouth portion 12$a$ whose radius decreases from the point $b$ to the point $a$ where its magnitude is approximately ⅓ of the maximum radius at point $b$.

In front of the port 12 the sperical upper face 14 of the piston constitutes a deflector 15 having a curved bottom $c$, $d$ in the region of this port, this bottom extending beyond the top of the piston in a flatter and even convex shape $d$, $e$, $f$.

The precombustion chamber B is roughly spherical and is formed, as concerns one part, by a cavity 16 in the body of the cylinder head 6 and, in respect of another part by a cavity 17 in a support 18 for the injector carrier 18$a$. The support 18 is secured to the cylinder head. An antideflagration ring 19 is disposed between these two parts.

It will be observed, furthermore, that the housing 20 for the support 18 is placed in the longitudinal axial plane of the engine and comprises large openings 21 communicating with the water jacket 22 of the cylinder head. In the region of these openings the support 18 has wall portions of reduced thickness constituting a cavity 23 which insures an excellent cooling of the injector 24.

The engine operates in the conventional manner and there is therefore no need to describe this in detail. However, the advantages of the described arrangement will be referred to.

The more or less hemispherical shape of the combustion chamber A permits placing the transfer port 12 rather near to the upper part of the cylinder and near to the axis W—W of this cylinder. This has the great advantage of spreading the ignited jet over the central zone of the dome of the piston 3 which affords a large area of diffusion for the heat. The heat is evenly distributed over the whole of the periphery of the piston while allowing the piston rings 4 to function freely at all points and avoiding any damage to the cylinder head gasket 5 whose performance is therefore considerably improved.

Further, as the transfer port 12 leads to the centre of the dome of the piston it is able to satisfy all requirements: inclination $z$ of its axis Z—Z, diameter and shape of the diffusion cone of the port 12 required for a good combustion and an excellent engine starting when cold. This is achieved by means of a few trials simply involving the replacement of the taper-threaded element 13 by another element.

As concerns the dome head of the piston it comes as near as possible to the heads of the closed valves 10, 11 and thereby decreases the useless volume of the hemispherical chamber A while presenting, by the curved and flat surfaces of its recess 15, a profile which, when combined with the outlet $a$–$b$ of the transfer port 12 contributes to a complete combustion and consequently very high efficiency.

Note that the precombustion chamber B is very easily constructed and is therefore of low cost price. Owing to its particular design, it is easy to insert the ring 19 which insures both a good turbulence and low consumption for a given power.

Trials have shown that in respect of an operating speed of 3500 r.p.m., it is possible to obtain an excellent idling speed of 250 r.p.m. and very good starting when cold.

Although specific embodiments of the invention have been described, many modifications and changes may be made therein without departing from the scope of the invention as defined in the appended claims.

Having now described my invention what I claim as new and desire to secure by Letters Patent is:

1. An internal combustion engine comprising a cylinder head, a cylinder block secured to the cylinder head, a cylinder defined by the cylinder head and cylinder block and having an axis, a piston slidable in the cylinder on said axis, means defining a precombustion chamber in the cylinder head, a dome-shaped wall in the cylinder head forming a substantially hemispherical combustion chamber in the cylinder, a transfer port provided in the cylinder head in a position offset from said axis and having an axis which is substantially radial relative to the substantially hemispherical combustion chamber and putting the precombustion chamber in communication with the combustion chamber, the transfer port having a substantially frustoconical shape which is divergent in the direction of the combustion chamber, a mouth portion connecting the dome-shaped wall to the transfer port, the mouth portion having a periphery which is radiused in the region of the mouth portion adjacent said axis of the cylinder so that the transfer port merges into the dome-shaped wall in a direction toward said axis of the cylinder, the piston having a substantially hemispherical dome-shaped upper end, and a deflecting recessed portion in said upper end which extends from a region which is in alignment with the transfer port axis in the top dead center position of the piston in the cylinder to beyond said axis of the cylinder.

2. An internal combustion engine comprising a cylinder head, a cylinder block secured to the cylinder head, a cylinder defined by the cylinder head and cylinder block and having an axis, a piston slidable in the cylinder on said axis, means defining a precombustion chamber in the cylinder head, a dome-shaped wall in the cylinder head forming a substantially hemispherical combustion chamber in the cylinder, a transfer port provided in the cylinder head and putting the precombustion chamber in communication with the combustion chamber, the transfer port being divergent in the direction of the combustion chamber and offset from said axis in a radial plane of the cylinder, the piston having a substantially hemispherical dome-shaped upper end, and a deflecting recessed portion in said upper end which extends from a region which is in alignment with the transfer port axis in the top dead center position of the piston in the cylinder to beyond said axis of the cylinder, whereby the transfer port cooperates with the recessed portion and constitutes a gas diffusion and turbulence zone in the combustion chamber, induction and exhaust ports provided in said dome-shaped wall and contained in a plane at right angles to said radial plane of the cylinder, valves cooperative with said induction and exhaust ports and having axes which make a large angle therebetween of approximately 70° the induction and exhaust ports occupying the greatest possible part of the diametral extent of the dome-shaped wall.

3. An internal combustion engine comprising a cylinder head, a cylinder block secured to the cylinder head, a cylinder defined by the cylinder head and cylinder block and having an axis, a piston slidable in the cylinder on said axis, means defining a precombustion chamber in the cylinder head, a dome-shaped wall in the cylinder head forming a substantially hemispherical combustion chamber in the cylinder, a transfer port provided in the cylinder head and putting the precombustion chamber in communication with the combustion chamber, the transfer port being divergent in the direction of the combustion chamber and offset from said axis in a radial plane of the cylinder, the piston having a substantially hemispherical dome-shaped upper end, and a deflecting recessed portion in said upper end which extends from a region which is in alignment with the transfer port axis in the top dead center position of the piston in the cylinder to beyond said axis of the cylinder, whereby the transfer port cooperates with the recessed portion and constitutes a gas diffusion and turbulence zone in the combustion chamber, a cavity in the cylinder head, a support secured to the cylinder head and having a second cavity connected to the cavity in the cylinder head, an injector carrier mounted in the support and carrying an injector, the precombustion chamber being substantially spherical and formed partly by the cavity in the cylinder head and partly by said second cavity.

4. An internal combustion engine having a longitudinal plane and comprising a cylinder head, a cylinder block secured to the cylinder head, a cylinder defined by the cylinder head and cylinder block and having an axis contained in said plane, a piston slidable in the cylinder on said axis, means defining a precombustion chamber in the cylinder head, a concave dome-shaped wall in the cylinder head forming a substantially hemispherical combustion chamber in the cylinder, a transfer port provided in the cylinder head in a position offset from said axis in said plane and having an axis which is substantially radial relative to the substantially hemispherical combustion chamber and putting the precombustion chamber in communicaiton with the combustion chamber, the transfer port having a substantially frustoconical shape which is divergent in the direction of the combustion chamber, a mouth portion connecting the dome-shaped wall to the transfer port, the mouth portion having a periphery which is radiused in the region of the mouth portion adjacent said axis of the cylinder so that the transfer port merges into the dome-shaped wall in a direction toward said axis of the cylinder, the piston having a dome-shaped top end which is substantially the convex counterpart of said concave dome-shaped wall, a deflecting recess in said top end, the recess extending diametrally across the top end of the piston from a region of the piston in alignment with the transfer port axis when the piston is in the top dead center position in the cylinder, beyond said axis of the cylinder, the recess having in said region of the piston a curved concave shape, whereby the recess communicates with the transfer port in said top dead center position of the piston and constitutes a gas diffusion and turbulence zone for the combustion chamber, induction and exhaust ports in said dome-shaped wall and valves cooperative with the induction and exhaust ports, the valves having axes which are contained in a plane at right angles to said longitudinal plane and make a large angle therebetween of substantially 70° which permits giving said valves such size as to result in a rapid feeding and scavenging of the combustion chamber at high engine operational speeds.

References Cited by the Examiner
UNITED STATES PATENTS

| | | | |
|---|---|---|---|
| 1,414,384 | 5/1922 | Tartrais. | |
| 1,821,817 | 9/1931 | Rochefort | 123—33 |
| 1,892,040 | 12/1932 | Montazet et al. | 123—33 |
| 2,080,189 | 5/1937 | Schwaiger | 123—32.8 |
| 2,560,799 | 7/1951 | Johnson | 123—32.8 |
| 2,769,434 | 11/1956 | Witzky | 123—32.4 |
| 2,932,289 | 4/1960 | Witzky | 123—32.4 |

MARK NEWMAN, *Primary Examiner.*

RICHARD B. WILKINSON, *Examiner.*

L. M. GOODRIDGE, *Assistant Examiner.*